(12) United States Patent
Mettler

(10) Patent No.: US 9,901,776 B2
(45) Date of Patent: *Feb. 27, 2018

(54) RACKET SPORT INERTIAL SENSOR MOTION TRACKING ANALYSIS

(71) Applicant: Icuemotion, LLC, Minneapolis, MN (US)

(72) Inventor: Bérénice Mettler, Minneapolis, MN (US)

(73) Assignee: ICUEMOTION LLC, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/609,723

(22) Filed: Jan. 30, 2015

(65) Prior Publication Data

US 2015/0141178 A1    May 21, 2015

Related U.S. Application Data

(63) Continuation of application No. 13/370,422, filed on Feb. 10, 2012, now Pat. No. 8,944,940.

(Continued)

(51) Int. Cl.
*A63B 24/00* (2006.01)
*G09B 19/00* (2006.01)
*A63B 49/00* (2015.01)

(52) U.S. Cl.
CPC ...... *A63B 24/0003* (2013.01); *A63B 24/0062* (2013.01); *A63B 49/00* (2013.01);
(Continued)

(58) Field of Classification Search
CPC .. A63B 24/0003; A63B 24/0062; A63B 49/00
See application file for complete search history.

(56) References Cited

U.S. PATENT DOCUMENTS 4,257,594 A    3/1981   Conrey et al.
4,303,241 A    12/1981  Burroughs
(Continued)

FOREIGN PATENT DOCUMENTS

EP    2752224 A1    7/2014
RU    2364436 C2    8/2009
(Continued)

OTHER PUBLICATIONS

The extended European Search Report dated Apr. 21, 2015 in connection with European Application No. 12827395.0.
(Continued)

*Primary Examiner* — Tramar Harper
*Assistant Examiner* — Anh Vo V Nguyen
(74) *Attorney, Agent, or Firm* — Dorsey & Whitney LLP

(57) ABSTRACT

A system for a racket comprises an inertial sensor for coupling to the racket, a processor connected to the inertial sensor, and a memory device connected to the processor. The inertial sensor includes an accelerometer array with three degrees of freedom in acceleration and a gyro array with three degrees of freedom in rotation. The processor is configured to generate stroke profiles describing acceleration and rotation of the racket based on signals from the accelerometer and the gyro arrays, and the memory device is configured to store the stroke profiles.

28 Claims, 8 Drawing Sheets

Related U.S. Application Data

(60) Provisional application No. 61/528,522, filed on Aug. 29, 2011.

(52) U.S. Cl.
CPC ...... *G09B 19/0038* (2013.01); *A63B 2220/13* (2013.01); *A63B 2220/34* (2013.01); *A63B 2220/40* (2013.01); *A63B 2220/62* (2013.01); *A63B 2225/15* (2013.01); *A63B 2225/50* (2013.01)

(56) References Cited

U.S. PATENT DOCUMENTS

| | | | |
|---|---|---|---|
| 5,031,909 | A | 7/1991 | Pecker |
| 5,154,427 | A * | 10/1992 | Harlan ............... A63B 24/0006 473/218 |
| 5,226,650 | A | 7/1993 | Suttner |
| 5,368,042 | A | 11/1994 | O'Neal et al. |
| 5,419,562 | A | 5/1995 | Cromarty |
| 5,646,911 | A | 7/1997 | Davis |
| 5,694,340 | A * | 12/1997 | Kim ................... A63B 24/0006 434/252 |
| 6,032,530 | A | 3/2000 | Hock |
| 6,314,339 | B1 | 11/2001 | Rastegar et al. |
| 6,565,449 | B2 | 5/2003 | Buhler |
| 6,649,905 | B2 | 11/2003 | Grenlund |
| 7,021,140 | B2 | 4/2006 | Perkins |
| 7,160,200 | B2 | 1/2007 | Grober |
| 7,264,554 | B2 | 9/2007 | Bentley |
| 7,536,033 | B2 | 5/2009 | Kirby |
| 7,602,301 | B1 | 10/2009 | Stirling et al. |
| 7,891,666 | B2 | 2/2011 | Kuenzler et al. |
| 8,323,107 | B2 | 12/2012 | Amit |
| 8,337,335 | B2 | 12/2012 | Dugan |
| 8,602,922 | B2 | 12/2013 | Schwenger et al. |
| 8,944,940 | B2 | 2/2015 | Mettler |
| 2002/0077189 | A1 | 6/2002 | Tuer et al. |
| 2002/0107077 | A1 | 8/2002 | Buhler |
| 2002/0134153 | A1 | 9/2002 | Grenlund |
| 2003/0024311 | A1 | 2/2003 | Perkins |
| 2004/0243261 | A1 | 12/2004 | King |
| 2004/0259651 | A1 | 12/2004 | Storek |
| 2005/0017454 | A1 | 1/2005 | Endo et al. |
| 2005/0054457 | A1 | 3/2005 | Eyestone et al. |
| 2005/0227775 | A1 | 10/2005 | Cassady et al. |
| 2005/0261073 | A1 | 11/2005 | Farrington, Jr. et al. |
| 2006/0025229 | A1 | 2/2006 | Mahajan et al. |
| 2006/0052173 | A1 | 3/2006 | Telford |
| 2006/0166737 | A1 | 7/2006 | Bentley |
| 2006/0184336 | A1 | 8/2006 | Kolen |
| 2007/0105664 | A1 | 5/2007 | Scheinert et al. |
| 2007/0111811 | A1 | 5/2007 | Grober |
| 2007/0135225 | A1 * | 6/2007 | Nieminen .......... A63B 24/0006 473/212 |
| 2007/0207873 | A1 | 9/2007 | Rose |
| 2007/0265105 | A1 | 11/2007 | Barton et al. |
| 2008/0200287 | A1 | 8/2008 | Marty et al. |
| 2008/0312010 | A1 | 12/2008 | Marty et al. |
| 2009/0143926 | A1 | 6/2009 | Almalki et al. |
| 2009/0209358 | A1 * | 8/2009 | Niegowski ........... A43B 3/0005 473/223 |
| 2010/0121228 | A1 | 5/2010 | Stirling et al. |
| 2010/0184564 | A1 | 7/2010 | Molyneux et al. |
| 2011/0021280 | A1 * | 1/2011 | Boroda .............. A63B 24/0021 473/220 |
| 2011/0143319 | A1 | 6/2011 | Bennett et al. |
| 2011/0183787 | A1 | 7/2011 | Schwenger et al. |
| 2011/0202152 | A1 | 8/2011 | Barton et al. |
| 2011/0230265 | A1 * | 9/2011 | Amit ................... A61B 5/1123 463/35 |
| 2011/0230274 | A1 * | 9/2011 | Lafortune ........... A43B 3/0005 473/217 |
| 2012/0050529 | A1 * | 3/2012 | Bentley .................. G01S 19/19 348/139 |
| 2012/0052973 | A1 | 3/2012 | Bentley |
| 2012/0136464 | A1 | 5/2012 | Saito et al. |
| 2012/0157241 | A1 | 6/2012 | Nomura et al. |
| 2013/0018493 | A1 | 1/2013 | Amini |
| 2013/0018494 | A1 * | 1/2013 | Amini ................ A63B 24/0006 700/91 |
| 2013/0053190 | A1 | 2/2013 | Mettler |
| 2013/0095939 | A1 | 4/2013 | Meadows et al. |
| 2013/0095962 | A1 | 4/2013 | Yamamoto et al. |
| 2013/0128022 | A1 * | 5/2013 | Bose ..................... H04N 7/18 348/77 |
| 2013/0267339 | A1 * | 10/2013 | Boyd .................... A63B 69/36 473/223 |
| 2014/0278219 | A1 | 9/2014 | Canavan et al. |
| 2015/0196803 | A1 | 7/2015 | Shavit et al. |
| 2017/0061817 | A1 | 3/2017 | Mettler |

FOREIGN PATENT DOCUMENTS

| | | |
|---|---|---|
| WO | 2006004908 A2 | 1/2006 |
| WO | 2009043558 A1 | 4/2009 |
| WO | WO 2011/036567 A2 | 3/2011 |
| WO | 2015123474 A1 | 8/2015 |
| WO | 2016025460 A1 | 2/2016 |
| WO | 2017040242 A1 | 3/2017 |

OTHER PUBLICATIONS

Communication pursuant to Article 94(3) dated Jan. 2, 2016 in corresponding European Patent Application No. 12827395.0.
International Search Report and Written Opinion dated Mar. 9, 2017 in connection with International Patent Application No. PCT/US2016/048871, 16 pages.
Abernathy et al., "Expertise and the perception of kinematic and situational probability information" Abstract, Perception, 2001; 30(2): 233-252.
Bernardi et al., "Mental practice promotes motor anticipation: evidence for skilled music performance" Abstract, Frontiers in Human Neuroscience, 2013; 7:451.
Bernstein, "The Co-ordination and Regulation of Movements", Science, Jan. 26, 1968: vol. 159, Issue 3813, p. 415.
Gibson, "The Ecological Approach to Visual Perception: Classic Edition" Introduction, Psychology Press, 1986.
Kugler et al., Information, natural law, and the self-assembly of rhythmic movement Abstract, Hillsdale, N.J., NJ Erlbaum Associates, (1987).
Landlinger et al., "Key factors and timing patterns in the tennis forehand of different skill levels", J. Sports Sc. & Med., 9(4): 643 (2010).
Lee et al., "Sensory and intrinsic coordination of movement", Royal Soc. of London, pp. 2029-2035 (1999).
Posner, "Orienting of Attention", The Quarterly Journal of Experimental Psychology, 1980, 32:3-35.
Warren, "The Dynamics of Perception and Action", Psychological Review, (2006), vol. 113, No. 2, pp. 358-389.
Williams et al., "Anticipation skill in a real-world task: Measurement, raining, and transfer in tennis" Abstract, Journal of Experimental Psychology: Applied, vol. 8(4), Dec. 2002, pp. 259-270.
International Search Report and Written Opinion of International Application No. PCT/US2015/044620, 12 pages, dated Nov. 11, 2015.
Extended European Search Report dated Nov. 29, 2017 in connection with European Patent Application No. 15831843.6, 10 pages.

* cited by examiner

RACKET SPORT INERTIAL SENSOR MOTION TRACKING ANALYSIS

CROSS-REFERENCE TO RELATED APPLICATIONS

This is a continuation of U.S. patent application Ser. No. 13/370,422, RACKET SPORT INERTIAL SENSOR MOTION TRACKING ANALYSIS, filed Feb. 10, 2012, now issued as U.S. Pat. No. 8,944,940, which claims priority to U.S. Provisional Application No. 61/528,522, RACKET SPORT INERTIAL SENSOR MOTION TRACKING AND ANALYSIS, filed Aug. 29, 2011, each of which is incorporated by reference herein, in the entirety and for all purposes.

BACKGROUND

This invention relates generally to motion tracking and analysis, and specifically to tracking and analysis techniques for tennis and other racket sports. In particular, the invention concerns inertial sensor-based techniques for stroke reconstruction and analysis.

SUMMARY

This invention is directed to a racket system for stroke analysis, and methods of using the system. The racket system includes a racket with a grip, a throat coupled to the grip, and a head coupled to the throat.

An inertial sensor is coupled to the racket, where the inertial sensor has an accelerometer array with three degrees of freedom in acceleration and an angular rate (or gyro) array with three degrees of freedom in rotation. A processor is connected to the inertial sensor, where the processor is configured to generate stroke profiles describing acceleration and rotation of the racket based on signals from the accelerometer and the gyro arrays. A memory device is connected to the processor, and configured to store the stroke profiles.

DETAILED DESCRIPTION

Figure 1A:
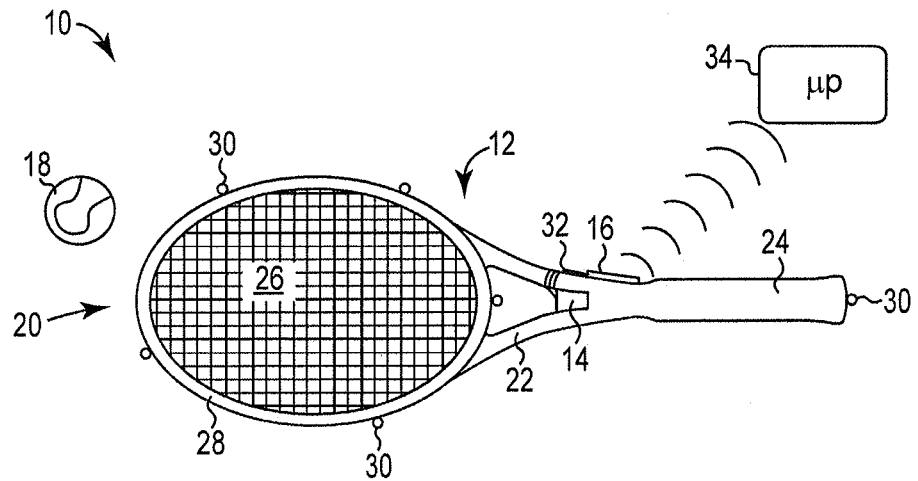
FIG. 1A is a schematic view of an inertial sensor-based racket tracking and stroke analysis system.

FIG. 1 is a schematic view of racket tracking and stroke analysis system 10. System 10 includes inertial sensor 14 and processor 16 for racket 12. Sensor 14 provides an accelerometer array with three degrees of freedom in acceleration and a gyro array with three degrees of freedom in rotational angle.

Processor 16 is connected to sensor 14 for racket tracking and stroke analysis based on signals from the accelerometer and gyro arrays, including racket interactions with ball 18. Processor 16 performs real-time (on-line) racket tracking and stroke analyses for use in interactive play, training and competition, including aerodynamic analysis as described below.

Racket (or racket system) 12 is formed with head 20 connected to grip or handle 24 at neck or throat 22. Head 20 includes a generally oblong, round or oval face portion 26, extending between opposite sides of rim or frame 28. Sensor 14 and processor 16 are typically attached to throat section 22, grip 24 or frame 28, or mounted inside racket 12, for example in a recess or internal cavity.

In some configurations, tracking markers 30 are attached to head 20, throat section 22 or grip 24 of racket 12, for use with a motion capture system or other electronic tracking system, as described below. In other configurations, tracking markers 30 are absent.

In the particular example of FIG. 1A, face 26 of tennis racket 12 is formed as a web or bed of strings that are stretched or strung across frame 28 to form a contact surface for ball 18. Alternate configurations include stringed rackets 12 for racquetball, racquets, hard rackets, squash, badminton and other racket sports, and paddle-type configurations for table tennis (ping pong), paddle ball and other paddle games. The configurations of head 20, throat section 22 and grip 24 vary accordingly, and ball 18 encompasses both ball and shuttle-type components for use with the various rackets and paddles 12.

Sensor 14 provides six degrees of freedom for tracking rigid-body motions of racket 12 as a function of time, including three degrees of freedom in angular position or rotation, and three degrees of freedom in spatial position or displacement. Suitable sensor array devices include, but are not limited to, micro-electronic-mechanical-sensor (MEMS) inertial measurement sensors (IMU), magnetic sensors and piezoelectric sensors.

Processor 16 is connected to sensor 14 via wire or data bus 32, or using a wireless connection. Processor 16 includes a data interface with memory and microprocessor (cpu) components to communicate with sensor 14, and to store, process and analyze motion tracking data for racket 12. Processor 16 may also include a transmitter for transmitting raw sensor data, stroke profiles, stroke trajectories and other output to an additional linked microprocessor (µP) 34, for example a linked personal computer (PC), laptop, tablet computer, smartphone, or other portable data processing system linked to processor 16 of "smart" racket system 12.

Whether alone or in combination with linked microprocessor 34, processor 16 provides racket tracking system 10 with on-line motion tracking and analysis and cueing capability based on real-time stroke reconstruction and analysis during training, interactive play, and competitive activities with racket 12. Racket tracking system 10 may also provide extended (off-line) motion tracking and analysis capability, as described below, for additional aerodynamic and kinematical studies of racket 12 and ball 18.

Figure 1B:
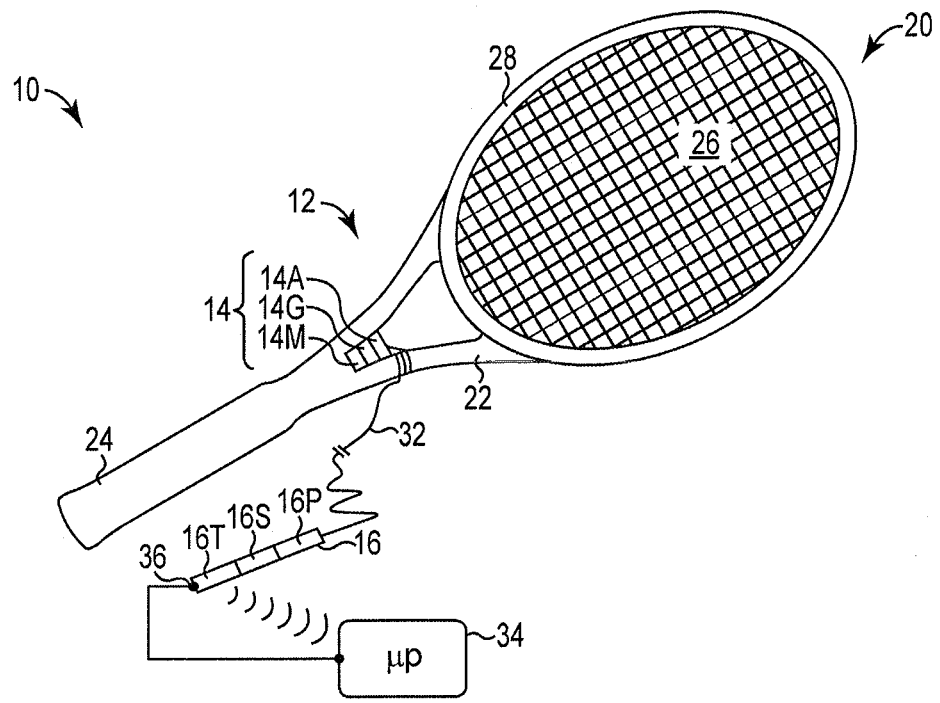
FIG. 1B is a schematic view of the racket tracking and stroke analysis system, in an external processor configuration.

FIG. 1B is a schematic view of racket tracking system 10, in an external processor configuration. In this configuration, processor 16 is mechanically decoupled from racket 12, and connected to sensor 14 using a flexible wire connection 32, or a wireless connection. This reduces the on-racket mass contribution of tracking system 10, for improved balance and performance.

As shown in FIG. 1B, inertial sensor 14 may include a combination of inertial accelerometer sensors 14A, inertial gyro sensors 14G and magnetic sensors 14M. Typically, sensors 14A, 14G and 14M are provided in triple-axis array configurations, in order to generate signals for acceleration, rotation and magnetic field measurements along three different axes, with three degrees of freedom in each measurement.

Processor 16 can be provided with a battery pack or other power source 16P, for increased computational power and operational life. Transmitter/processor 16 may also include supplemental processor components 16S, such as a breakout board, data interface or flash memory system, and wireless or hard-wired transmitter 16T, for communication with linked microprocessor 34 via data port 36 and data link 37, via wireless signals, or a combination thereof. In these configurations, processor 16 is also referred to as transmitter 16, or a combined processor/transmitter 16.

Battery pack 16P, supplemental processor components 16S and transmitter 16T can be provided in lightweight, relatively low power configurations, so that processor 16 has substantially similar data processing and power usage capabilities in both integrated (on-racket) and external (off-racket) configurations. In particular, lightweight processor/transmitter components 16P, 16S and 16T may be internally mounted in throat section 22, grip 24 or frame 28 without substantially altering the balance, stroke and play characteristics of racket 12.

Figure 2:
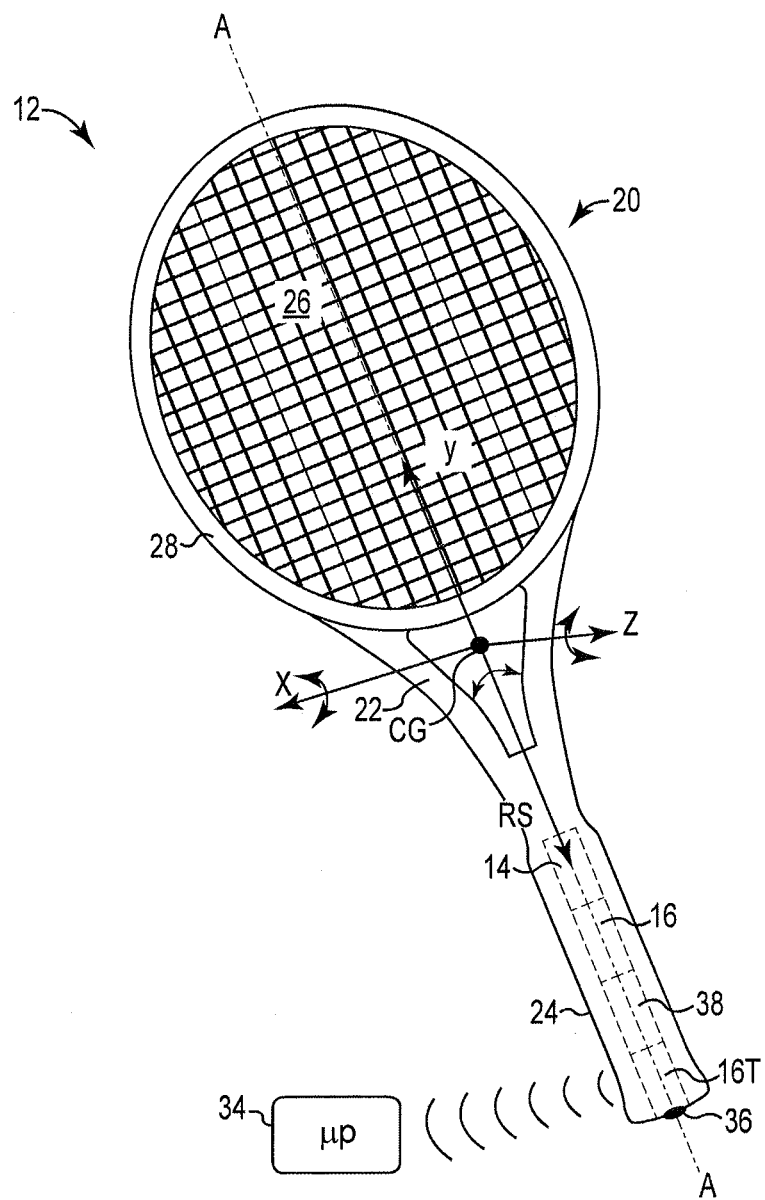
FIG. 2 is schematic illustration of a body coordinate frame for the racket of FIGS. 1A and 1B.

FIG. 2 is schematic diagram illustrating body coordinate frame [X Y Z] for racket system (or "smart racket") 12. Body coordinate frame (or system) [X Y Z] is defined with respect to center of gravity (or center of mass) CG of racket system 12, for example in throat section 22.

Center of gravity CG is the point about which head 20 and grip 24 rotate in a free (unconstrained) racket system. Primary axis A of racket system 12 typically extends through center of mass CG, between head 20 and grip 24 in throat section 22.

In the particular example of FIG. 2, perpendicular coordinate axes [X Y] are defined in the plane of racket face or string bed 26, with the Y axis extending along major axis A of racket system 12. The Z axis is perpendicular to the X and Y axes, extending out of the plane of FIG. 2 to define right-handed orthogonal coordinate frame [X Y Z].

Note, however, that this particular choice of axes is merely representative. Alternatively, the axes can be offset from center of gravity CG or transposed to define body coordinate frame [X Y Z] in either a right-handed or left-handed sense. Other body frames define skew or non-perpendicular coordinate axes, and use more generalized cylindrical or spherical coordinates.

Position vector RS represents the position of inertial sensor (or sensor array) 14 with respect to center of gravity CG, as defined in the body centered frame. As shown in FIG. 2, for example, sensor 14 is located in an internal cavity in grip 24, along major axis A, together with an integrated processor 16.

Sensor 14 is sensitive to three independent degrees of freedom in motion with respect to the position of racket system 12, as defined along coordinate axes [X Y Z], and three additional degrees of freedom with respect to rotation of racket system 12, as defined about coordinate axes [X Y Z]. Processor 16 is connected to sensor 14, and provides motion tracking and analysis based on the acceleration and gyro signals (motion data) from sensor 14.

In the wireless, internal processor/transmitter configuration of FIG. 2, processor 16 includes a radio frequency (RF), infrared (IR) or other wireless transmitter 16T to communicate with linked microprocessor 34. In some designs, hard-wired data port 36 is also provided, for offline data downloads, calibration, and additional tracking and analysis functions. In additional designs, processor 16 is connected to cueing device (cue generator) 38, in order to provide real-time audio, haptic (e.g., vibration) or optical (light) cues based on the stroke analysis output from processor 16, as described below. These cues are typically used by the player, or can be relayed to the opponent to enable cueing the player's actions.

Figure 3A:
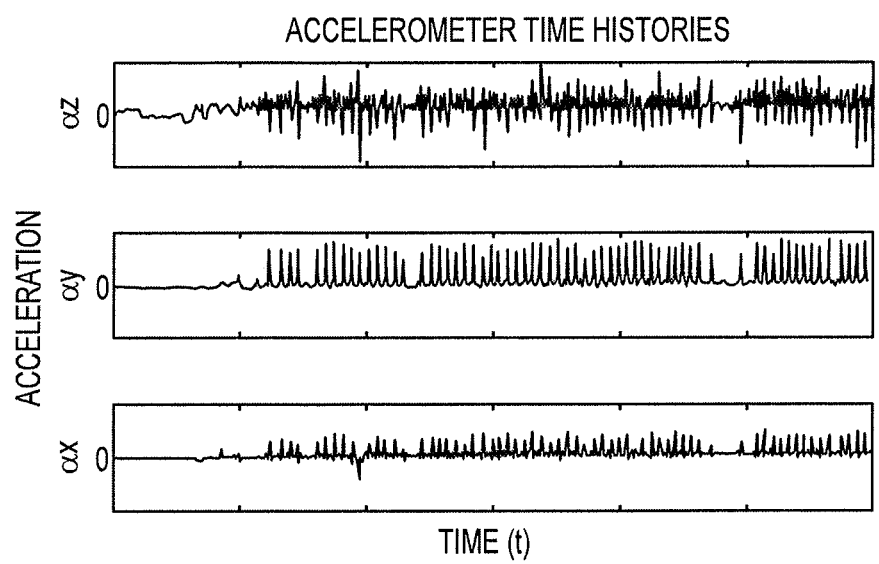
FIG. 3A is a plot of accelerometer time histories for a racket tracking system, in three spatial dimensions.

FIG. 3A is a plot of accelerometer time histories for a racket tracking system, in three independent spatial dimensions based on body coordinate frame [X Y Z] of FIG. 2. In this particular convention, acceleration ax (bottom) is defined along the racket face, perpendicular to the major axis, acceleration ay (middle) is defined along the major axis, perpendicular to ax, and acceleration az (top) is transverse to the racket face, perpendicular to ax and ay.

Accelerations ax, ay and az are plotted along the vertical axis in arbitrary units (not necessarily using the same scale), as a function of time on the horizontal (also in arbitrary units, but using the same scale). The acceleration plots thus form stroke histories, with sharp peaks or spikes representing effects of impulse forces (momentum transfer) during ball strikes and interactions with the ground and net (or player). The stroke histories also include effects of inertial, gravitational, aerodynamic and player grip forces on the racket, which are present continuously during and between the individual ball strikes.

Figure 3B:
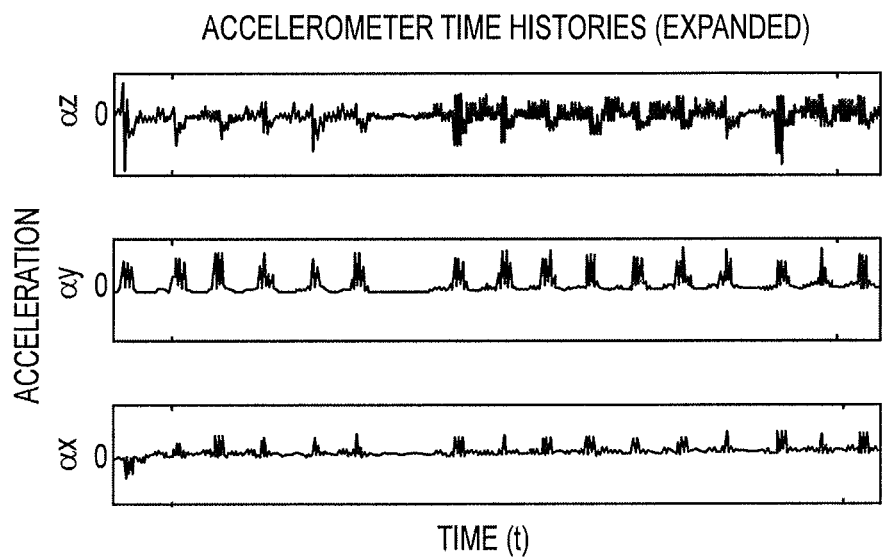
FIG. 3B is an expanded plot of the accelerometer time histories in FIG. 3A, showing individual strokes.

FIG. 3B is an expanded plot of the accelerometer time histories in FIG. 3A, showing individual impulse spike train during a stroke cycle. As shown in FIG. 3B, stroke and ball interactions can be substantially periodic or quasi-periodic, with variations about a base or fundamental frequency associated with the rhythm associated with the type of play such as groundstroke rally or volley play. Other stroke histories are intermittent or non-repeating, for example service strokes and certain approach shots, spikes, and lobs. Net and ground strikes provide additional intermittent impulse-type features.

Figure 4A:
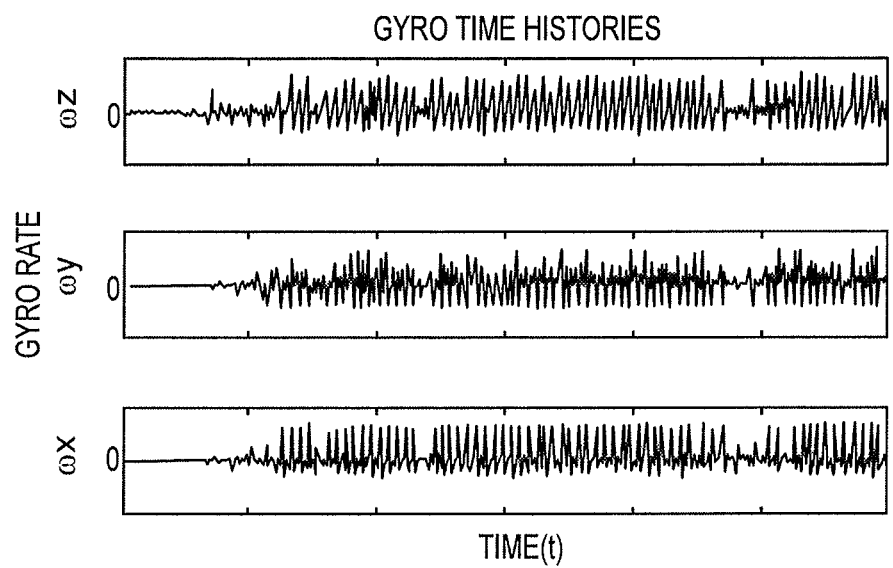
FIG. 4A is a plot of angular rate time histories for a racket tracking system, in three rotational dimensions.

FIG. 4A is a plot of gyro time histories for a racket tracking system. The gyro histories are given in terms of angular velocities ωx (bottom), ωy (middle) and ωz (top), defining gyro rates about coordinate axes X, Y and Z of FIG. 2, respectively. The gyro rates are plotted in arbitrary units on the vertical, versus time on the horizontal (also in arbitrary units).

The gyro plots of FIG. 4A represent rotational stroke histories, corresponding to the acceleration stroke histories of FIG. 3A. In particular, the peaks in FIG. 4A represent impulse moments (angular momentum transfers) during ball strikes and other racket interactions, corresponding to the simultaneous impulse forces representing linear momentum transfers in FIG. 3A. The ball typically strikes the racket with an offset from the CG, resulting in an offset in the impulse. The ball strike therefore causes a simultaneous change in linear and angular momentum of the racket.

Figure 4B:
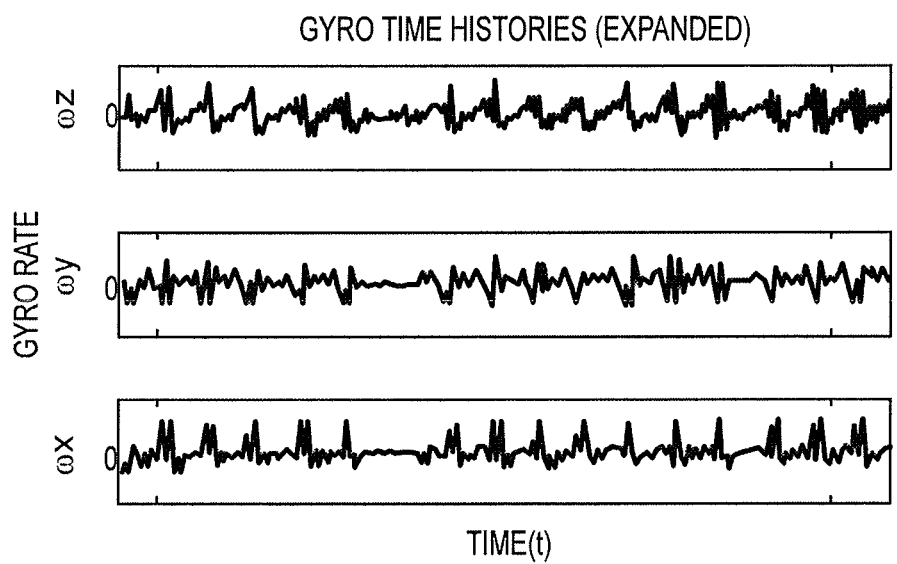
FIG. 4B is an expanded plot of the angular rate time histories in FIG. 4A, showing individual strokes.

FIG. 4B is an expanded plot of the gyro time histories in FIG. 4A, showing a combination of rhythmic (periodic or quasi-periodic; repeating) strokes and intermittent (aperiodic; non-repeating) racket interactions, as described above. The gyro plots also include continuous inertial, gravitational, aerodynamic and player grip moments (or torques), extending between and through the interaction peaks.

Figure 5A:
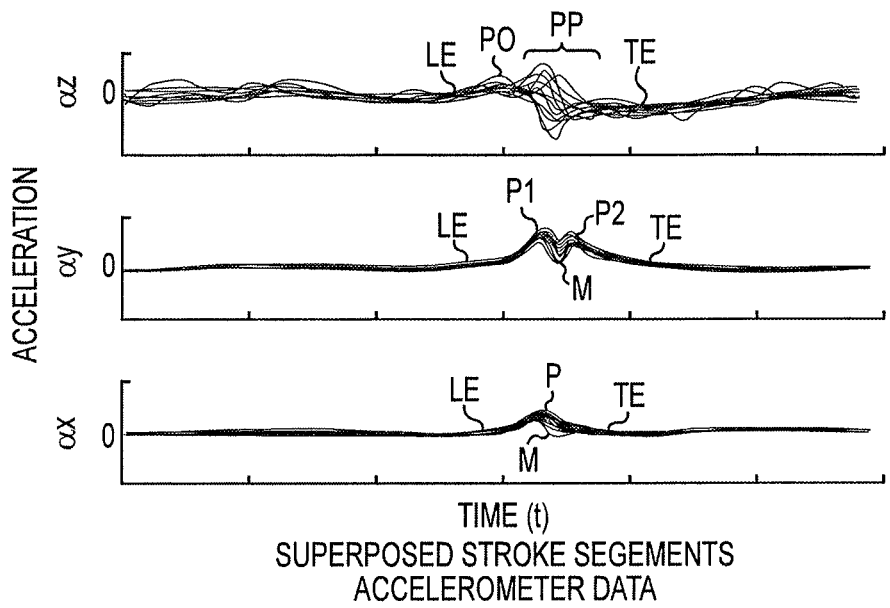
FIG. 5A is a plot of superposed stroke segments based on the accelerometer time histories of FIGS. 3A and 3B.
Figure 5B:
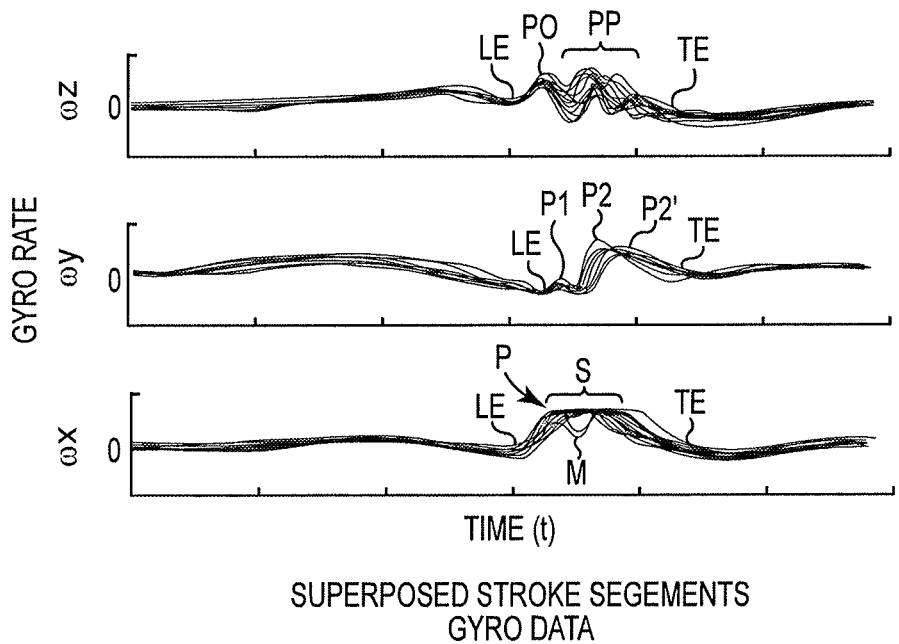
FIG. 5B is a plot of superposed stroke segments based on the angular rate time histories of FIGS. 4A and 4B.

FIG. 5A is a plot of superposed stroke profiles based on the accelerometer time histories of FIG. 3A, showing continuous inertial, acceleration, aerodynamic and player grip forces with impulsive momentum transfers during ball strikes and other racket interactions. FIG. 5B is a corresponding stroke profile superposition based on the gyro time histories of FIG. 4A, showing continuous grip and aerodynamic moments with impulsive angular momentum transfers.

To generate the stroke superposition plots of FIGS. 5A and 5B, ball strikes and other interaction impulses are identified in the sets of acceleration and gyro data (the stroke histories), and the stroke histories are subdivided (or segmented) into individual stroke segments or samples (stroke profiles) based on the impulse interactions. The interaction impulses are identified by pattern matching and other signal processing and pulse identification algorithms, and the stroke profiles are time-matched based on the leading edge or peak pulse height, or using other pulse matching techniques such as based on the trailing edge, mean interaction time or signal co-variation.

FIGS. 5A and 5B show that a number of stroke characteristics are shared in the acceleration and gyro stroke histories, while other characteristics are different. In one axis, for example (e.g., the X axis; bottom plots), the stroke profiles are substantially single-peaked in both the acceleration and gyro rate time histories; that is, there is generally one local maximum P between leading edge LE and trailing edge TE.

Saturation regions S can be observed in any of the acceleration or gyro rate plots, where the maximum signal amplitude of the inertial sensor or processor is reached. Saturation effects can be addressed by integrating the (saturated) pulse height, by resetting or recalibrating the electronic gain, or by reconfiguring the sensor array with a lower hardware gain.

FIGS. 5A and 5B also show that not all stroke profiles are the same. In particular, while the X axis acceleration and gyro profiles are typically single-peaked, some strokes have a double-peaked profile with local minima M between leading edge LE and trailing edge TE. These and other stroke characteristics are used to identify different classes or types of stroke profile, and to define stroke repertoires (or classes) based on the stroke characteristics. In addition, different stroke characteristics can be used to define analysis tools that are proper to a particular stroke type, for example forehand and backhand strokes, lobs, approach shots and service strokes.

In the Y axis plots (middle), the acceleration profiles are characteristically double peaked; that is, both the acceleration and gyro data generally exhibit first and second local maxima P1 and P2 between leading edge LE and trailing edge TE. In the acceleration data, moreover, the two peaks have similar magnitudes, with first peak P1 generally 10-50% higher than second peak P2, and peaks P1 and P2 separated by a strong local minima M.

In the gyro data, however, first peak P1 is substantially smaller than second peak P2, for example only 10-30% as high. In addition to sharp peak profile P2, moreover, with a steep rise and high amplitude, there is also a shallow peak profile P2', with a lower rise and peak amplitude. These additional features and characteristics allow the stroke profiles to be further divided into different classes, for example first and second service strokes, higher and lower lob strokes, and different types of forehand and backhand strokes, with relatively more or less spin (angular momentum) and velocity (linear momentum) transfer. The features come about through interaction of the player's imparted forces and the ball, and therefore also provide diagnosis about the player's skills and technique.

In the Z axis plots (top), both the acceleration and gyro time histories show rich pulse structure, with an initial pulse P0 followed multiple additional peaks PP between leading edge LE and trailing edge TE. Thus, the stroked profiles can be further classified according to the number of peaks and relative rise times (slopes) in the Z axis data, for example using a triple-peak feature discriminator with relatively steeper and shallower third (or higher-order) peaks PP. A mathematical model of the racket motion that encompasses all the forces allows estimates of the respective contribution of these forces to the sensed motion, and identifies the physical significance of these features to the player's technique.

Figure 6:
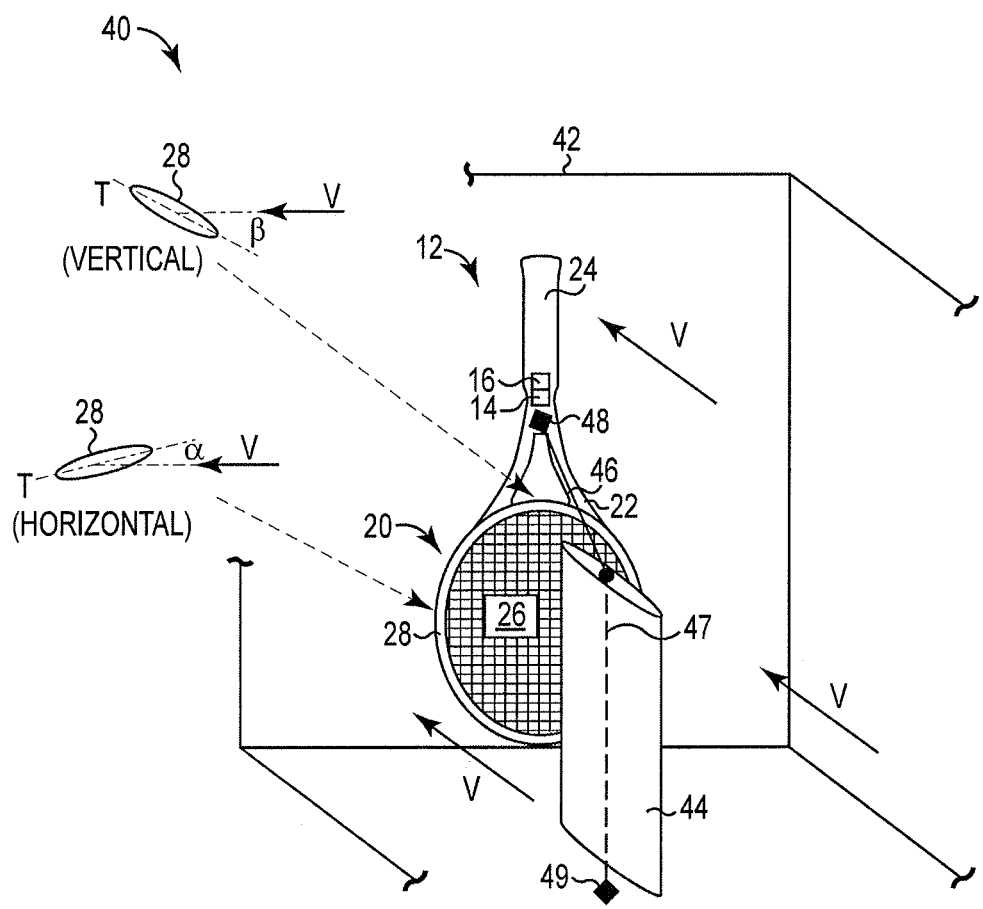
FIG. 6 is a schematic illustration of a wind tunnel apparatus for aerodynamic analysis of aerodynamic forces and moments on the racket.

FIG. 6 is a schematic illustration of wind tunnel apparatus 40 for aerodynamic analysis of racket system 12. Wind tunnel apparatus 40 includes a turbine, blower or other means for generating airflow within housing 42. Racket system 12 is supported from fairing 44 by strut 46, for example by attachment to throat section 22 or grip 24.

Racket sensor 48 is used to determine the aerodynamic forces and moments (or torques) on racket system 12, as a function of racket orientation and flow velocity V. Alternatively, strut sensor 49 may be used, where strut sensor 49 is coupled to racket system 12 via strut 46 and vertical support 47, inside fairing 44.

In operation of wind tunnel apparatus 40, airflow is incident on each component of racket system 12, generating aerodynamic forces on head 20, throat section 22, grip 24, face 26 and frame 28. Depending on racket orientation and flow velocity V, therefore, racket sensor 48 and strut sensor 49 will measure different moments and forces.

Frame 28 and portions of throat section 22, for example, have substantially airfoil-shaped cross sections, as shown in FIG. 6, taken either in a horizontal section along the side of frame 28, or in a vertical section at the top (or bottom) of frame 28. These cross sections define angle of attack $\alpha$ and sideslip angle $\beta$, as measured in the horizontal and vertical planes, respectively, and with respect to transverse axis T, perpendicular to face 26 of racket system 12.

Flow velocity V and aero angles $\alpha$ and $\beta$ thus determine the aerodynamic forces and moments on racket system 12 over a full range of different conditions, and across the different stroke profiles in the stroke portfolio. Note, however, that the aero angle definitions are arbitrary, and vary from application to application. In particular, because the airfoil portion of frame 28 is formed as a continuous hoop, it is also possible to take the defining cross sections at different locations on racket system 12, or to transpose aero angles $\alpha$ and $\beta$. To generate truth data for correcting the aerodynamic force and moment analysis, therefore, as described below, it is important to maintain consistent definitions, and to carefully transform the aero data between frames.

Figure 7:
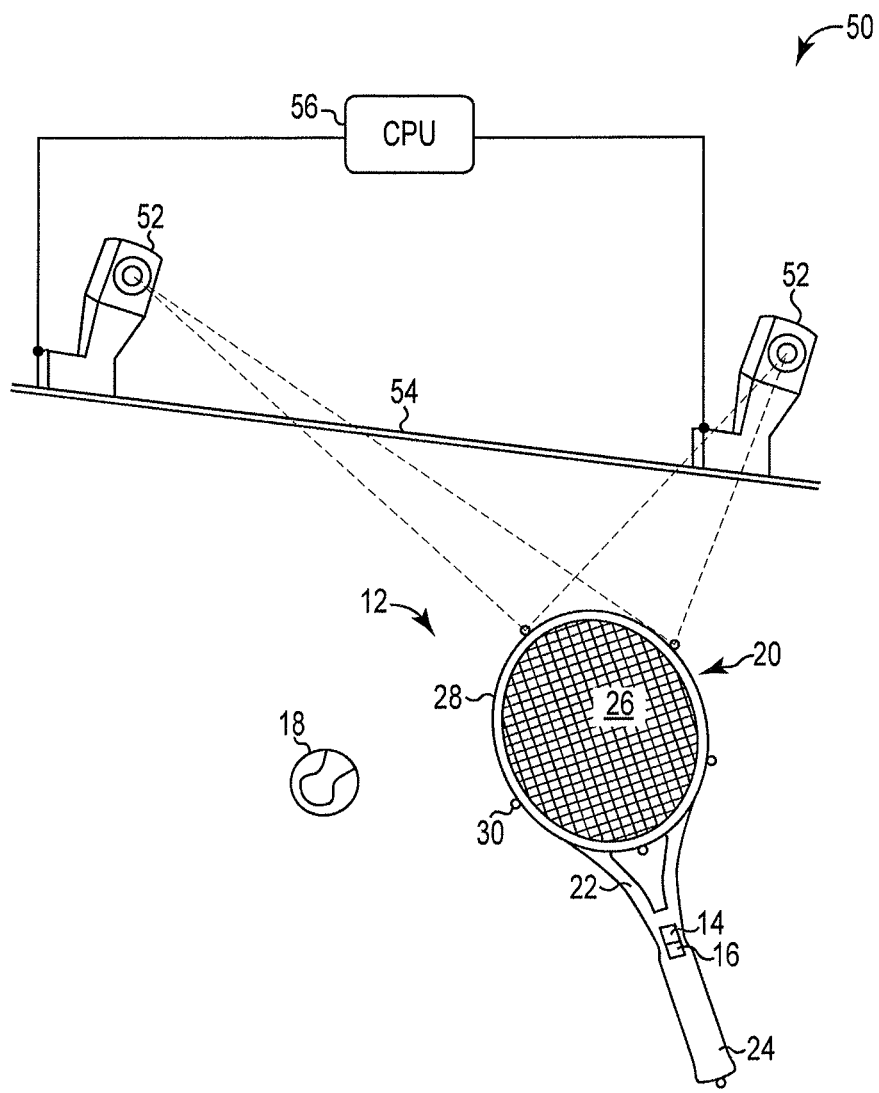
FIG. 7 is a schematic illustration of a motion capture system for calibrating a racket tracking system.

FIG. 7 is a schematic illustration of motion capture system 50 for calibrating racket system 12. Motion capture system 50 includes one or more wireless motion or position detectors 52, mounted on rails or other support structures 54. Motion detectors 52 are connected to a computer or central motion capture processor (CPU) 56, in order to measure the position and orientation of racket system 12. Motion capture processor 56 utilizes the position and orientation data to generate truth data for racket system 12, including calibration of sensor 14 and verification of the racket tracking and stroke reconstruction algorithms utilized by processor 16.

Tracking markers 30 define the orientation and position of racket system 12, including a centroid location for face 26 and head 20. Motion detectors 52 use visual, infrared, radio, audio or other sensing techniques to determine the locations of tracking markers 30, and motion capture processor 56 uses these locations to generate truth data describing the position and orientation or racket system 12, as expressed in the stationary (ground-based) frame of motion capture system 50. Optionally, motion is tracked based on the racket shape, without dedicated markers 30. Additional truth data are provided by magnetic sensors, for example magnetic sensors 14M of FIG. 1B, in either an internal or external sensor configuration.

The truth data are used to calibrate sensor 14 during interactions with ball 18, and to generate high fidelity stroke reconstruction by verifying and tuning the racket tracking algorithm implemented in processor 16. This allows processor 16 to determine the aerodynamic forces and torques on racket system 12, and to distinguish between the aerodynamic effects, the inertial forces and the player reaction forces on grip 24, and the impulse forces due to the ball 18 and other external interactions.

High fidelity stoke reconstruction also provides more accurate stroke trajectories in position, velocity and acceleration space, for both linear and angular variables. More accurate stroke trajectories, in turn, provide additional information for the stroke characterization tools as described below.

Figure 8A:
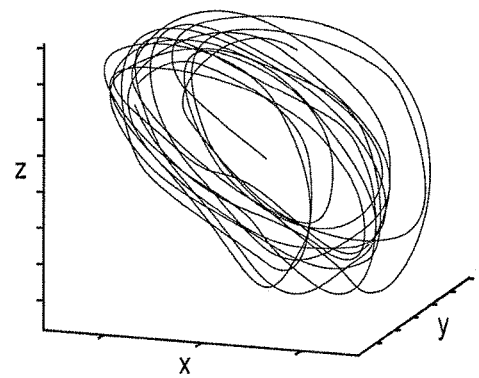
FIG. 8A is a phase space plot defining a racket trajectory as a function of time, in three-dimensional position vector space.

FIG. 8A is a phase space plot defining a racket trajectory as a function of time, in three-dimensional position vector space. The centroid of the racket system follows a three-dimensional path in this vector space, for example in the ground-based reference frame of motion capture system 50 as shown in FIG. 7, above. Alternatively, the trajectory is defined along orthogonal racket coordinates [X Y Z], or in another reference frame or coordinate system attached to the player or racket system.

In contrast to the superposed stroke profiles of FIGS. 5A and 5B, the racket trajectory of FIG. 8A is continuous (unsegmented), and follows the racket over a number of consecutive stroke segments. The three-dimensional trajectory also combines the concurrent information from the three acceleration and gyro axes, rather than considering them individually as in FIGS. 3A and 4A.

Figure 8B:
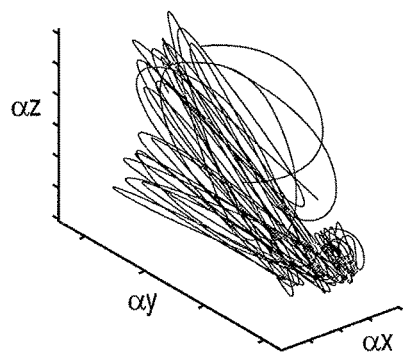
FIG. 8B is a phase space plot defining the racket trajectory in three-dimensional acceleration vector space.
Figure 8C:
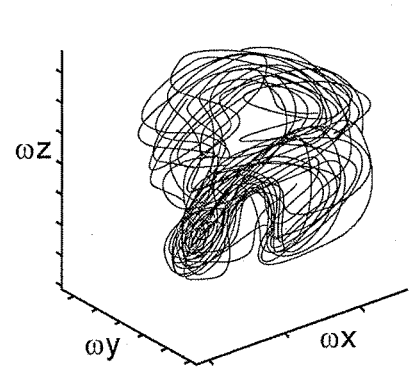
FIG. 8C is a phase space plot defining the racket trajectory in three-dimensional gyro angular rate vector space.

FIG. 8B is a phase space plot for the racket trajectory of FIG. 8A, in three-dimensional acceleration vector space. FIG. 8C is the corresponding phase space in three-dimensional gyro rate vector space. These data can be determined from raw accelerometer and gyro data, taken directly from the inertial sensor signals, and corrected based on truth data from a motion capture system or magnetic sensor array. Alternatively, the acceleration and gyro rate trajectories can be generated by applying appropriate kinematic transformation on the position space trajectory of FIG. 8A, where the truth data have already been incorporated into the trajectory reconstruction.

EXAMPLES

The following examples describe applications of racket tracking system 10 and smart racket system 12, as shown in FIGS. 1A, 1B and 2, either alone or in combination with wind tunnel apparatus 40 of FIG. 6 and motion capture system 50 of FIG. 7. In addition, the examples describe methods of stroke reconstruction and analysis based on tracking system 10 and smart racket 12, as illustrated in FIGS. 3A, 3B, 4A, 4B, 5A, 5B, 8A, 8B and 8C.

These examples employ a variety of different motion tracking techniques and technologies, including micro-electronic-mechanical-sensor (MEMS) inertial measurement sensors (IMU), wind tunnels and wireless motion capture systems, in order to provide a more comprehensive understanding of racket and player performance during live play and competition. The examples also encompass additional performance factors including, but not limited to, racket weight, balance and rigid-body motion characteristics, head size, stringing characteristics, aerodynamic effects and biomechanical effects. Further, the examples can be applied in any order or combination to improve racket tracking and stroke and human performance analysis.

As a first step, racket tracking system 10 provides an integrated sensor, processor and transmitter configuration that can be embedded into a wide range of different racket and paddle designs, without substantially interfering with playability. As a second step, racket system 12 provides the processing capabilities needed to support real-time inertial sensor data analysis, for high fidelity stroke reconstruction and detailed, accurate stroke analysis. As a third step, racket tracking system 10 and racket system 12 provide methods of stroke and player analysis directed to the goal of identifying key relationships between physical racket characteristics and player performance, for better equipment/player matching and improved competitive ability. Such analysis can be executed offline, for post play analysis, or can be executed during play where the information from the analysis can be provided to the player in real time to provide cueing for training or shared with opponent player to enable interactive play features.

A number of technical innovations also provide for a more practical embedded motion tracking capability. These include primary capabilities for basic stroke analysis, and secondary capabilities based on the relationship between stroke analysis and physical racket characteristics. Advanced capabilities are also developed, for real-time interactive features blending racket characteristics, stroke analysis, and human (biomechanical) effects in live-game racket sports, both for training purposes and as applied to competitive play.

The racket systems and stroke analysis methods described here are also based on aerospace techniques, combining elements of aerodynamics, dynamics, kinematics, inertial and magnetic sensing technology, state vector (trajectory) estimation and finite element analysis. Under this approach, the racket is treated as an airframe, which is under the effect of external forces including gravity, aerodynamic forces, player forces on the grip, and interaction forces with the ball, ground or net. Under this more complete combined approach, these individual effects can be more effectively decoupled to enable detailed stroke reconstruction and analysis, for more complete feedback on player and equipment performance.

In particular, racket trajectories (stroke motions) are reconstructed using measurements from advanced, lightweight, inertial sensors, which provide three independent degrees of freedom in both translation and rotation, for a total of six degrees of freedom. The equations of motion are developed from the fundamental laws of rigid-body translation and rotation, and include gravity and aerodynamic effects across the full range of stroke profiles and trajectories.

This approach simultaneously determines force and moment (torque) contributions from the stroke impulse (or ball interaction) and the player's reaction on the grip, using the airframe analysis to account for additional aerodynamic forces and moments. This allows the stroke and grip data to be decoupled from the aero forces, in order to analyze the stroke profile and determine relationships between stroke motions and the physical characteristics of the racket, and to determine how each of the individual forces and moments contributes to overall racket and player performance.

Example 1: Racket Hardware

As shown in FIG. 2, miniature MEMS inertial (IMU) sensor 14 provide six degrees of freedom (DOF) for inertial measurements of racket system 12, including three independent DOF for acceleration and three additional independent DOF for rates of angular rotation. With a mass of only a few grams or less, sensor 14 can be integrated into a wide range of racket systems 12 without substantially altering balance and other physical characteristics, and without substantial interference with playability and performance. In addition, advanced micro-controller designs also allow processor 16 to provide real-time stroke analysis and interactive performance feedback in both external and internal (integrated) processor/transmitter configurations, including audio, visual and haptic signals from cueing device 38.

More specifically, processor 16 provides first-stage analysis capability for real-time stroke (racket flight path) reconstruction based on inertial data from sensor 14, encompassing all the individual forces and moments acting on racket system 12. In addition, processor 16 also provides for automatic segmentation of the stroke data into individual stroke profiles, and identifies key stroke attributes and performance parameters such as racket speed, spin, turning rates, and force and moment impulses as well as variations in these parameters.

Data from processor 16 can also be used for second stage and offline data analyses, either alone on in combination with an additional linked microprocessor 34. In this stage of analysis, spin, impulse and other stroke attributes can be used to investigate different racket characteristics, including, but not limited to, racket mass, balance, head size, grip size, and string tension and composition.

Additional analysis tools are provided to support ensemble-based stroke pattern analysis, as described below, using statistical measures of the stroke characteristics to categorize individual strokes into different stroke types. Statistical pattern analysis also enables stroke recognition needed for new interactive cueing systems and live play analysis techniques.

Example 2: Motion Sensing and Analysis

This example describes additional technologies and hardware instrumentations utilized in racket system 12 of FIGS. 1A, 1B and 2. Sensor 14, for example, may incorporate a gyro, accelerometer and magnetic sensor/IMU with nine degrees of freedom, such as a SPARKFUN®—Razor IMU, available from SparkFun electronics of Boulder, Colo. In this configuration, sensor 14 includes a triple-axis accelerometer sensor array 14A for linear accelerations along three independent axes, a triple-axis gyro sensor array 14G for rotations about the three axes, and a triple-axis magnetic sensor array 14M for magnetic field measurements along the three axes.

As so configured, sensor 14 has a mass of about 7 grams. The accelerometer sensitivity range (maximum amplitude) is about 16 g (about 150 m/s$^2$), and the gyro range is about 300 deg/sec (about 5.25 rad/sec).

The accelerometer and gyro data from sensor 14 are calibrated using truth data from an independent tracking system, such as motion capture system 50 of FIG. 7. The magnetic field sensors also provide truth data for calibration and testing, measuring the local magnetic field strength with sufficient sensitivity to determine the relative orientation of the accelerometer and gyro axes with respect to a fixed (ground-based) reference frame.

Sensor 14 is connected to processor 16 via a data bus or cable, for example a universal serial bus (USB) or other cabling standard, or using a wireless connection. Processor 16 includes a microcontroller/microprocessor with an interface for data communications with sensor 14, a lightweight battery pack or other power supply 14P, transmitter 14T, and a memory system or other supplemental component 14S. In one particular example, processor 16 incorporates a GUMSTIX VERDEX PRO microcontroller, as available from Gumstix Inc. of Portola Valley, Calif., configured for writing to a microSD card or other flash memory system 14S, with communications to linked microprocessor 34 via a BLUETOOTH® transmitter 14T, or other wireless interface.

In operation of racket tracking system 10, sensor 14 and processor 16 are attached to an outside surface of racket system 12, or placed in an internal cavity. For example, racket tracking system 10 may provide sensor 14 and processor 16 as a motional analysis unit or module, separate from racket 12, where modular system 10 comprises sensor 14 and processor 16 for attachment to racket 12 using a strap, VELCRO, tape, adhesive or other means. Alternatively, racket tracking system 10 may comprise modular sensor 14 for attachment to racket 12 and modular processor 16 for wearing by or attachment to a player, for example using straps, VELCRO, tape, adhesives or other means to attach processor 16 to the player's wrist, arm or hip, and a data wire, USB cable, wireless connection or other means to connect processor 16 to sensor 14 for communications, data transfer, or both.

Processor 16 reads accelerometer, gyro and magnetometer data from sensor 14, and performs preliminary (first stage) motion tracking and stroke analysis in real time, writing stroke histories, stroke profiles, stroke trajectories or other output to flash memory system 14S. Depending on configuration, processor 16 can also download data to linked microprocessor 34 via transmitter 14T or data port 36, or a combination thereof, for additional (second stage, offline) analysis and processing.

In advanced configurations of Racket system 12, sensor 14 may have a mass of about 1 gram or less, with acceleration and angular measurement ranges suitable for high-performance players, for example 16-bit gyro sensors with a ±2000 deg/sec (about 35 rad/sec) sensitivity range, and 13-bit accelerometer sensors with a ±16 g (about ±150 m/s$^2$) range. In addition, processor 16 may have a mass of about 11 grams or less, for example using GUMSTIX® OVERO® AIR microcontroller with a GUMSTIX® PINTO-TH breakout board.

In additional configurations, processor 16 may include one or more of a ARDUINO PRO interface 16S with a mass of 2 grams or less, as available from Atmel Corporation of San Jose, Calif., a polymer lithium ion battery pack 16P with a mass of about 18.5 grams or less, and a power converter 16S with a mass of 1.6 grams or less. In addition, processor 16 may include audio, visual or haptic signal cueing devices 38 for real-time feedback. Suitable cueing devices 38 include, but are not limited to, an audio signal generator such as a buzzer or beeper, a piezoelectric or electromagnetic vibrator, and an LED light or small LED or LCD screen.

Processor 16, whether alone or in combination with linked microprocessor 34, provides capabilities for real-time data acquisition, collection, storage and processing, including state estimation for stroke trajectories describing angular and linear accelerations, velocities and positions, and real-time interactive feedback. In these configurations, processor 16 includes one or more of a VERDEX PRO microcontroller, an OVERO AIR embedded computer board 16S, a PINTO-TH breakout board 16S, and an ARDUINO PRO interface 16S, as described above.

In each of these configurations, processor 16 provides sufficient computing power for real-time first-stage tracking and stroke analysis. In one such configuration, processor 16 runs a Linux-based operating system on CORTEX™-A8 processor with 256 MB of RAM, as available from ARM Holdings plc of Cambridge, England (UK).

Breakout board 16S can be configured to provide a USB port 36, along with digital communication lines for reading and writing from sensor 14. Sensor data (motion and magnetic signals) are collected from sensor 14 at rates from 100-500 Hz, or up to 3.2 kHz or more, and stored in a microSD card or other flash memory system 16S with 1.6 GB or more memory for second-stage (offline) analysis. In addition, processor 16 may also include a transmitter 16T with Wifi or BLUETOOTH capabilities, or a combination thereof, for transferring data to a PC or other linked microprocessor 34. Such data transfer can be used to receive and send data to enable interactive play with opponent.

Example 3: IMU Measurements, Data Processing and Acceleration

In use of racket system 12 as shown in FIG. 2, processor 16 analyzes raw acceleration, angular and magnetic field data from sensor 14. The accelerometers, gyros and magnetic field arrays generate sensor signals at the mounting point of sensor 14, given by position vector RS as defined with respect to center of gravity CG in racket body frame [X Y Z].

The acceleration in the racket body frame ($a_S'$) is related to the acceleration in an "inertial" (ground-based) frame by:

$$a_S' = a_S - R_B g_I,\qquad [1]$$

where $a_S$ is the acceleration in the ground frame, $R_B$ is the rotation matrix or tensor defining the transformation from the ground frame to the racket body frame, and $g_I=[0\ 0\ 9.81]$ is the three-dimensional gravitational acceleration vector (or covector), as defined in the ground frame.

The angular motion of racket system 12 is taken into account via angular rate vector $\Omega=[\omega_x\ \omega_y\ \omega_z]'$, as defined in the racket body frame. Based on the kinematics of the respective reference frames, the acceleration in the racket body coordinate system is:

$$a_S' = \frac{F}{m} + \Omega \times (\Omega \times R_S) + \dot{\Omega} \times R_S,\qquad [2]$$

where F is the vector sum of the external forces (player grip forces, aerodynamic forces, gravity and ball impact or interaction forces). The second term in this expression is the centripetal acceleration, and the third term is the tangential acceleration.

To define stroke histories, stroke segments, stroke profiles, stroke trajectories and stroke ensemble data, racket system 12 with sensor 14 was utilized in a variety of ground strokes, rally and volley play. Using one or both of processor 16 and linked microprocessor 34, motion tracking and stroke analysis data were generated to verify that the accelerometer, gyro and magnetic sensor ranges (and other specifications) were suited for applications in tennis and other racket and paddle sports.

Rather than treating all the stored data together as a bulk signal train, the accelerometer and gyro measurements (stroke histories) are segmented into stroke profiles based on pattern matching and identification of impulse peaks, and the stroke profiles are divided into stroke types based on selected stroke characteristics and racket motions. In this approach, individual stroke profiles are identified, stored and analyzed as single movement units, and grouped or assimilated into stroke ensembles. Statistical pattern analysis techniques are applied to the stroke ensemble data in order to provide more comprehensive stroke characteristics, such as dependence on physical racket parameters and player biomechanics, as well as the changes of these characteristics over time.

FIGS. 3A and 4A show the linear acceleration and angular rate vector components for a complete rally, respectively, and FIGS. 3B and 4B show an expanded time slice for selected strokes within the rally. In FIGS. 5A and 5B, the strokes are segmented and superposed, in linear acceleration space and angular rate space, respectively, in order to analyze stroke patterns and characteristics.

The superposition plots of FIGS. 5A and 5B show distinctive patterns in both the acceleration and angular rate (gyro) data. This demonstrates the feasibility these techniques for measuring different stroke characteristics, including single-peak, double-peak and multiple-peak analysis, as described above.

To increase utility for training, competition and research, the stroke profile data in FIGS. 3A, 3B, 4A, 4B, 5A and 5B are processed to extract actual stroke trajectories. Actual trajectory estimation and reconstruction requires substantial modeling and analysis. While similar techniques are utilized in flight control and navigation for aerospace applications, moreover, the complexity and nonlinearity of these techniques makes it difficult or impossible to accurately predict results for any given racket system 12, based on generic aerospace results. In particular, the grip, aerodynamic, gravitational and interaction (ball impact) force and moment contributions must all be considered in order to fully reconstruct the racket trajectories (kinematics), forces (dynamics) and moments (rotational effects), and this is impossible without considering the particular configuration of racket system 12.

Example 4: Racket Motion and Stroke Trajectory Reconstruction

In general, the primary driver of any given stroke is provided by player forces on grip 24. Ultimately, however, the trajectory of racket system 12 is determined by the laws of motion, which require six degrees of freedom to represent rotation and translation in all three spatial dimensions. Full reconstruction of the stroke profile thus requires that all substantial forces and moments be considered, including grip forces, inertial, gravity and interaction impulses, as well as aerodynamic forces that depend on the flight mechanics of racket system 12.

Sensor 14 is used to measure the acceleration and angular (rotation) rates of racket system 12, as described above. Processor 16 provides the corresponding data processing capability for real-time (first-stage) and offline (second-stage) motion tracking and stroke analysis, either alone or in combination with linked microprocessor 34.

These processing capabilities include state estimation algorithms to reconstruct the three dimensional flight path (trajectory) of racket system 12, as well as aerodynamic modeling algorithms, for example based on data from wind tunnel apparatus 40 of FIG. 6. In addition, validation and calibration algorithms are utilized, based on truth data from magnetic sensors and other independent measurement systems, for example motion capture system 50 of FIG. 7. Processor 16 also provides force and moment estimation algorithms for reconstructing the external forces and moments acting on racket system 12, during individual stroke interactions.

Processor 16 utilizes these and other algorithms to determine angular motion parameters (roll, pitch and yaw angle), velocities ($v_x$, $v_y$ and $v_z$), and trajectory or position data (x, y and z) from the acceleration and angular rates measured by sensor 14. In addition, processor 16 employs state estimation methods that combine the sensor measurements with a mathematical model of the racket dynamics to provide a more accurate computation of these quantities, including positions, velocities and accelerations in linear and rotational space.

The equations of motion are used to model racket system 12 as a rigid body, with known moment of inertia I and mass m. In the body frame reference system, with origin located at the center of gravity, the equations of motion are:

$$m\ddot{x} + m(\Omega \times \dot{v}) = F \qquad [3]$$

and $$I\dot{\Omega} + \Omega \times (I\Omega) = M, \qquad [4]$$

where x is the racket position vector and $\Omega = [\omega x\ \omega y\ \omega z]'$ is the racket angular rate vector. The external force and moment (or moment) vectors are $F = [F_x\ F_y\ F_z]'$ and $M = [M_x\ M_y\ M_z]'$, respectively.

The equations of motion result in six coupled, nonlinear differential equations for translations and rotations with respect to three independent axes X, Y and Z. The force and moment vectors include individual contributions from the gravitational force ($F_g = R_B g_I$), aerodynamic forces $F_a$ and moments $M_a$, impact/interaction (ball) forces $F_i$ and moments $M_i$, and player grip (reaction) forces $F_p$ and moments $M_p$.

Gravitational forces $F_g$ are given by racket mass m, based on the composition and physical configuration of the racket. Aerodynamic forces $F_a$ are a function of racket airspeed (relative velocity) and standardized aerodynamic coefficients, for example as extracted using wind tunnel apparatus 40 of FIG. 6. Impact forces $F_i$ are estimated based on an impulsive force (large magnitude, short duration) model, making it possible to substantially isolate impact forces $F_i$ and impact moments $M_i$ from the other forces and moments.

Example 5: Aerodynamic Forces and Moments

Racket head 20 may reach considerable speeds during individual strokes, for example up to 30-40 m/sec or more. This prompts racket manufacturers to minimize drag, and most racket systems 12 are designed with streamlined frame 28 and throat section 22.

Based on the relative air velocity, racket system 12 will thus produce lift and drag moments and forces during each stroke. The effects are similar to that of an airfoil, but again it is not practical to generalize generic results from aerospace research because of the very different racket geometry. This includes the hoop-shaped airfoil construction of frame 28, and the additional airfoil features of throat section 22, requiring the used of wind tunnel apparatus 40 as described above with respect to FIG. 6, or a similar engineering facility.

With careful, system-specific measurements, however, aero forces $F_a$ and moments $M_a$ can be modeled using standard aerodynamic coefficients. The racket lift force, for example, is given by:

$$L = \frac{1}{2}\rho V^2 S C_L, \qquad [5]$$

where $\rho$ is the air density, V is the relative air velocity and $C_L$ is the racket lift coefficient. Similarly, the pitching moment is given by:

$$M = \frac{1}{2}\rho V^2 S_C C_M, \qquad [6]$$

where $C_M$ is the pitching (moment) coefficient and $S_C$ is planform area times the chord length, or the projection of the planform area onto the chord length.

Racket head speed can be sufficiently large to produce substantial aerodynamic forces $F_a$ and moments $M_a$, which depend on relative velocity V of airflow over the racket frame. Angle of attack $\alpha$ and side-slip angle $\beta$ are thus relevant variables, but these vary over the stroke based on the relative velocity and orientation of the racket head with respect to the surrounding air, as described in FIG. 6, above. Analogous to an aircraft, the aerodynamic effects vary with angle of attack $\alpha$ and sideslip angle $\beta$, providing the player with some degree of control by adjusting the aerodynamic angles of the racket.

Existing techniques do not consider these effects on stroke technique and performance. Racket tracking system 10, in contrast, considers aerodynamic forces $F_a$ and moments $M_a$ as part of the overall stroke analysis, including the effect of aerodynamic control mechanisms on racket and player performance.

In particular, aerodynamic effects are the only other contribution, besides the player grip forces and moments, available to the player to affect the racket flight path. Thus, by considering aerodynamic forces $F_a$ and moments $M_a$ together with player grip forces $F_p$ and moments $M_p$, racket tracking system 10 provides a more complete model of the equations of motion, in which unknown interaction forces $F_i$ and moments $M_i$ are more fully constrained, and can be unambiguously determined.

The aerodynamic forces and moments are described by the aerodynamic coefficients $C_L$ (lift coefficient), $C_D$ (drag coefficient), and $C_M$ (pitching moment coefficient), as described above. The aero coefficients, in turn, are obtained from wind tunnel experiments, as a function of the measured lift L, drag D, and pitching moment M for different values of airspeed V, angle of attack α and side-slip angle β. Thus, $$C_L = f_L(V,\alpha,\beta), \quad [7]$$

$$C_D = f_{DL}(V,\alpha,\beta), \quad [8]$$

and $$C_M = f_M(V,\alpha,\beta). \quad [9]$$

This allows the individual aerodynamic coefficients to be extracted based on the wind tunnel data, for example using wind tunnel apparatus 40 of FIG. 6.

Example 6: State Vector Estimation and Verification

One approach to state vector estimation is to use a Kalman filter. Similar techniques for generating state vector estimates are based on prior knowledge and real-time measurements, with variance or uncertainty included in the outputs. Regardless of approach, however, the combination of external (player grip), aerodynamic, gravitational and interaction (ball impact) forces and moments on racket system 12 presents substantial analytical challenges for processor 16, which are not adequately addressed by existing motion tracking and stroke reconstruction techniques.

In racket system 12, on the other hand, processor 16 takes advantage of particular features that are characteristic of the individual stroke profiles. In particular, the racket trajectory is constrained by the periodic nature of the stroke motion, and the impulsive nature of the ball (interaction) forces and moments allows a reliable state estimation algorithm to be developed across racket impacts. Processor 16 also utilizes racket state estimation algorithms that account for changes in the angular rates and accelerations outside of the interaction (or impact) window, providing reliable estimates of the player forces and moments on grip 24, based on a full understanding of the corresponding aerodynamic effects on frame 28 and the other components of racket system 12.

These state vector estimation algorithms are also applicable to biomechanical studies, where the changes in the player grip forces are particularly relevant. Truth data are used to tune and verify the state estimation algorithms, based on a combination of racket motion measurements and inertial motion data from sensor 14.

The truth data are obtained from a combination of magnetic sensor arrays 14M and independent motion tracking systems. In one such example, motion capture system 50 of FIG. 7 utilizing a VICON motion system, as available from Oxford metrics Group plc of Oxford, England (UK).

Example 7: Stroke Analysis

Racket tracking system 10 encompasses a number of different stroke analysis applications for racket system 12. In first stage analysis, processor 16 provides sufficient computational power for generating accelerometer and gyro time histories collected during a rally in real time, as shown in FIGS. 3A, 3B, 4A and 4B.

In addition, processor 16 automatically segments the stroke data based on pulse matching and selected stroke characteristics, in order to generate superposed stroke profiles as shown in FIGS. 5A and 5B. The stroke profiles are further differentiated into stroke classes or stroke types based on selected stroke characteristics including, but are not limited to, stroke pace (frequency or period), spin (angular momentum impulse) and the motion of racket head 20 at impact, including normal and tangential velocities and accelerations. Additional stroke characteristics include impact intensity, based on linear and angular momentum transfers, and player forces $F_g$ and moments $M_g$ acting on racket grip 24.

Second-stage statistical methods are also used. In contrast to physics-driven analysis, this approach identifies additional stroke characteristics that are not obvious or accessible from intuition. In particular, higher-dimensional geometrical features of the data are exploited, including higher-order derivatives and non-physics-based combinations of the acceleration and gyro data.

Stroke features and characteristics (or descriptors) are also analyzed within identified patterns or clusters, in order to identify additional stroke performance metrics and related stroke characteristics. In this example, statistical stroke analysis identifies stroke patterns (or clustering) in the inertial sensor-based trajectories of FIGS. 8B and 8C, based on the three-dimensional acceleration and angular rates for an extended stroke history, encompassing a number of individual stroke profiles.

In the acceleration phase space diagram, for example, strokes tend to approach an attractor-type feature in the lower right (toward the front of FIG. 8B), at a median value of acceleration ax. In addition, the strokes exhibit a two-lobed structure extending along the ay/az plane. Neither of these features is evident in the accelerometer time histories of FIG. 3A or the superposed acceleration profiles of FIG. 5A, nor are they obvious based on a priori physics principles.

Similarly, the angular rate data exhibit an attractor-type feature in the central region of FIG. 8C, with two distinct spiral structures extending along the ωx/ωz and ωx/ωy planes. Again, these features are not shown in the individual gyro histories of FIG. 4A or the superposed angular rate profiles of FIG. 5B, and it is not obvious how these features would have been predicted a priori, based on generic physics and engineering principles. These features, however, are relevant since they are manifestations of the interactions between the racket, the player and the ball.

Example 8: Motion Tracking and Stroke Analysis Methods

The stroke analysis methods described here can also be used to investigate the effects of racket design on the stroke profiles, and ultimately on the player's performance. For example, mass, weight distribution (balance), racket frame aerodynamics, string type, gauge and tension affect the forces and moments the player experiences through the racket grip, the aerodynamic forces and moments, and the forces and moments from the ball impact with the racket face and therefore the racket trajectory. By explicitly accounting for these characteristics in the analysis of the stroke profiles, it is possible to determine what physical characteristics of the racket will help a particular player achieve best play performance.

Statistical analyses can be used to identify these stroke characteristics and racket parameters that affect player performance, without physical model. In contrast to physics-based analysis, these methods represent a data-driven approach where the goal is to discover unknown relationships between stroke profiles and player performance, where the relationships are not obvious from first principles.

These stroke analysis methods are also used to provide real-time feedback during live play, training and competition. In particular, stroke analysis can be used to identify target or model stroke profiles, features and characteristics, with audio, haptic and visual cuing to provide positive reinforcement based on matching the model profiles, reinforcing good stroke techniques. Stroke analysis can also be applied to kinesthetic and biomechanical methods, including methods to determine relationships between particular stroke profiles corresponding effects on muscle fatigue, injury and recovery.

To practice these methods, smart racket system 12 provides an integrated motion sensor 14 and data processing/transmitter system 16, with combined racket tracking and stroke analysis capabilities including data storage, data retrieval and preprocessing, and automatic stroke data segmentation. Processor 16 also performs state vector estimation methods to reconstruct individual strokes and corresponding racket flight paths, and verifies stroke reconstruction accuracy and fidelity using truth data from magnetic sensors and an independent motion tracking system. This allows processor 16 to accurately estimate and determine all the substantial forces and moments acting on racket system 12, including player grip (reaction) forces and moments on grip 24, interaction (impulse) forces and moments on head 20, and gravitational and aerodynamic forces and moments that act on racket system 12 as a whole.

These methods encompass both primary (first-stage) and secondary (second-stage) motion tracking and stroke analysis techniques. The first stage techniques generate stroke profiles based on physical stroke characteristics, using racket-based physics analysis (kinematics and dynamics) to extract stroke characteristics including impact point, head speed and top spin from the inertial sensor data.

Second-stage methods employ data-driven statistical analysis to characterize additional stroke characteristics based on pattern recognition in order to characterize and identify dominant (primary), secondary and tertiary stroke patterns and profiles, and to build stroke repertoires and portfolios based on the different stroke patterns and profiles.

These statistical methods are also used to determine the effects of physical racket parameters on the racket trajectories and stroke characteristics, and to establish relationships between different stroke characteristics and racket parameters. In this approach, the relevant racket parameters include, but are not limited to, racket mass, balance, head size, grip size, string composition, string gage and string tension, as described above.

Live play methods apply stroke analysis to provide real-time haptic, audio and visual cuing based on real-time stroke segmentation and stroke feature characterization. For these methods, the relevant stroke characteristics and features include head speed, racket face orientation, impact point on the racket face, momentum transfer (or impulse), and spin (angular momentum transfer or moment impulse).

Additional methods utilize these stroke analysis and trajectory reconstruction techniques to provide online interactive analysis, including stroke profile processing and additional real-time feedback based on audio signals, haptic (vibration) cues, and visual displays. In multi-player applications, data from two or more individual smart racket systems are used to provide cross-cuing capability, for example to cue a first player based on stroke analysis of a second player.

In these methods, real-time stroke analysis provides player, coach and competitor cuing based on additional stroke features including, but not limited to, spin, topspin, backspin, racket speed, racket trajectory, ball speed, ball trajectory, and the magnitude and direction of the linear and angular momentum impulses measured during stroke interactions.

Real-time stroke trending analysis is also encompassed, including changes or trends in a stroke pattern or feature, and changes or trends in the variability of a stroke pattern or feature. Additional methods include statistical analysis of stroke variability for injury prevention, injury prediction, and variability-based learning.

Injury prediction and diagnosis include cuing based on changes or trends in a stroke profile, or changes or trends in the variability of a stroke profile. For these methods, variability is determined according to statistical methods applied to individual stroke profiles and stroke portfolios/repertoire, for example a variation, coefficient of variation, standard deviation, dispersion, likelihood or confidence level determined for a particular stroke feature or characteristic, as described above.

Auditory (sound), haptic (e.g., vibrational) and visual cuing methods also provide stroke feedback based on amplitude, pitch or frequency modulation, in order to indicate differences, changes or trends in a stroke profile or feature, or in the variability of a stroke profile or feature. These differences and changes can be determined with respect to a model stroke profile, for example using racket tracking data for a model player or coach. Alternatively, the differences and changes are based on a computer-generated stroke model, or a stroke history generated by comparing past and present stroke profiles for a particular player. Training, rehabilitation and injury prediction or diagnosis techniques are also provided, based on the stroke analysis, with or without real-time auditory, visual or haptic cueing.

Exteroceptive, proprioceptive (or proprioception-based) and kinesthesiology-based stroke analysis methods are also included. Depending on application, these methods utilize differences, changes and trends in stroke profiles, based on perceived, sensed, desired or otherwise selected stroke profiles (or goals), as compared actual stroke profiles (truth data). Alternatively, stroke analysis is based on differences, changes or trends determined with respect to goal profiles and biomechanical limits, where the biomechanical limits include absolute physics limits, injury-based limits selected for rehabilitation purposes, and training-based limits selected to improve player performance.

Additional methods include determining a variability range within a particular stroke profile, and determining perturbations and perturbation directions from the stroke profile, either within or outside the variability range. Further methods include real-time play analysis by classifying stroke profiles into stroke classes based on the corresponding racket trajectories and stroke characteristics, enumerating and differentiating the stroke classes, and establishing a stroke repertoire based on the enumerated stroke classes. This approach provides for additional training techniques, including identifying individual strokes within a given stroke repertoire, and providing audio, visual or haptic cuing to train players to add or improve strokes in the repertoire, or to avoid strokes in the repertoire.

With respect to racket selection, these methods provide for stroke analysis based on racket parameters including, but not limited to, weight, head size, grip size, racket length, string type (polymer, gut, or mixed), racket composition, and balance or weight distribution. In these analyses, player performance is evaluated based on the identified stroke profiles and repertoire, in order to select a racket based on one or more of the racket parameters, to identify a parameter for modification, or to signal the need for racket maintenance or replacement.

While this invention has been described with reference to exemplary embodiments, it will be understood by those skilled in the art that various changes may be made and equivalents may be substituted for elements thereof without departing from the spirit and scope of the invention. In addition, modifications may be made to adapt particular situations or materials to the teachings of the invention, without departing from the essential scope thereof. Thus, the invention is not limited to the particular examples disclosed here, but encompasses all embodiments falling within the scope of the appended claims.

The invention claimed is:

1. A racket system comprising:
an inertial sensor comprising an accelerometer with three degrees of freedom in measurement of acceleration of a racket and a gyro sensor with three degrees of freedom in measurement of angular rotation of the racket;
a processor in communication with the inertial sensor, the processor configured to:
generate time histories describing acceleration and rotation of the racket based on signals from the accelerometer and the gyro sensor;
identify pulse features in the time histories;
segment the time histories into individual stroke profiles based on time matching of the pulse features, wherein the acceleration and rotation of the racket define characteristics of the individual stroke profiles;
generate stroke trajectories based on the individual stroke profiles, the stroke trajectories describing position, velocity and orientation of the racket measured during stroke interactions; and
determine aerodynamic forces and moments acting on the racket based on the stroke trajectories; and
a memory device in communication with the processor, the memory device configured to store the individual stroke profiles;
wherein the individual stroke profiles are divided into stroke classes based on the corresponding characteristics, the stroke classes defining a stroke repertoire.

2. The racket system of claim 1, wherein the racket has an airfoil frame and the sensor and processor are internally mounted without substantially altering stroke and play characteristics of the racket.

3. The racket system of claim 2, wherein the inertial sensor and processor are configured to determine the aerodynamic forces on the airfoil frame and interaction forces including player grip forces on the racket.

4. The racket system of claim 1, further comprising a USB data port on a grip of the racket.

5. The racket system of claim 1, further comprising a wireless transmitter configured to send data describing the position and orientation of the racket, wherein the processor and transmitter are internally mounted in the racket without substantially altering balance thereof.

6. The racket system of claim 5, wherein the transmitter is BLUETOOTH capable.

7. The racket system of claim 6, wherein the transmitter is configured to transmit the data to enable interactive play with an opponent, wherein data from two such racket systems provide cross-cueing to a first player based upon stroke analysis of a second player.

8. The racket system of claim 1, further comprising a cueing device configured to generate real-time player cueing based on the pulse features in the time histories describing acceleration and rotation of the racket, including one or more of spin, topspin, backspin, racket speed and ball speed.

9. The racket system of claim 1, wherein the characteristics of the individual stroke profiles include ball impact point on the racket.

10. The racket system of claim 1, wherein the processor is further configured for real-time trending analysis including changes in a stroke feature, wherein variability in the stroke feature is determined according to the individual stroke profiles.

11. The racket system of claim 10, wherein the variability in the stroke feature provides for diagnosis about player technique.

12. The racket analysis system of claim 10, wherein the processor is further configured for real-time stroke analysis to provide coach or player cueing based the stroke feature.

13. The racket system of claim 12, wherein the processor is further configured for injury diagnosis based on stroke analysis of interaction forces and moments on the racket, using the stroke trajectories.

14. The racket system of claim 1, further comprising a cueing device coupled to the processor, the cueing device configured to generate real-time audio, haptic or visual player feedback based on conformance of the individual stroke profiles to a stroke model.

15. A method comprising:
sensing acceleration of a racket with an inertial sensor coupled thereto, the inertial sensor comprising an accelerometer with three degrees of freedom in measurement of acceleration of the racket;
sensing angular velocity of the racket with the inertial sensor, the inertial sensor further comprising a gyro sensor with three degrees of freedom in measurement of angular rotation of the racket;
generating time histories with a processor in communication with the inertial sensor, the time histories describing the acceleration and angular velocity of the racket;
identifying pulse features within the time histories;
generating individual stroke profiles by segmenting the time histories based on time matching of the pulse features, wherein the acceleration and angular velocity of the racket define characteristics of the individual stroke profiles;
storing the individual stroke profiles in memory, wherein the individual stroke profiles are divided into stroke classes based on the corresponding characteristics, the stroke classes defining a stroke repertoire;
estimating state vectors for converting the individual stroke profiles into stroke trajectories representing reconstructed racket flight paths, the state vectors describing position, velocity and orientation of the racket during stroke interactions; and
determining impact forces and angular momentum transfer from the racket to a ball and from the ball to the racket during the stroke interactions, wherein a ball strike causes a simultaneous change in linear and angular momentum of the racket.

16. The method of claim 15, further comprising generating a real-time cue based on speed or trajectory of the ball or racket.

17. The method of claim 16, wherein the real-time cue is further based on linear and angular momentum impulses measured during the stroke interactions.

18. The method of claim 15, further comprising calibrating the racket stroke analysis in a motion capture system utilizing position and orientation data to generate truth data for the racket, the truth data utilized to calibrate the inertial sensor during interactions with a ball and to verify racket tracking and reconstruction algorithms implemented by the processor.

19. The method of claim 15, further comprising the processor generating real-time trending analysis including changes in a stroke feature, wherein variability in the stroke feature is determined according to the individual stroke profiles to provide for diagnosis about player technique.

20. The method of claim 19, further comprising real-time cueing based on the variability in the stroke feature, the cueing provided to improve or avoid strokes in the stroke repertoire.

21. The method of claim 19, wherein the cueing is further provided for injury prediction and diagnosis.

22. A racket system comprising:
an inertial sensor coupled to a racket, the inertial sensor having three degrees of freedom in acceleration and three degrees of freedom in angular rotation;
a processor configured to:
generate time histories describing acceleration and rotation of the racket based on signals from the inertial sensor; identify pulse features in the time histories;
segment the time histories into individual stroke profiles based on time matching of the pulse features, wherein the acceleration and rotation of the racket define characteristics of the individual stroke profiles;
generate stroke trajectories based on the individual stroke profiles, the stroke trajectories describing position, velocity and orientation of the racket measured during stroke interactions,
wherein generating stroke trajectories further comprises reconstructing external forces and moments acting on the racket system during the stroke interactions; and
a cueing device coupled to the processor, the cueing device configured to generate realtime audio, haptic or visual player feedback based on conformance of the individual stroke profiles to a stroke model.

23. The racket system of claim 22, wherein the smart racket has an airfoil frame and further comprising a grip with a USB data port therein.

24. The racket system of claim 22, further comprising a wireless transmitter internally mounted in the smart racket without substantially altering stroke and play characteristics thereof.

25. The racket system of claim 22, wherein the cueing device is configured for cross-cueing a first player based upon stroke analysis of an opponent player, the cross-cueing further based on the pulse features in the time histories describing acceleration and rotation of the racket, including one or more of spin, topspin, backspin, racket speed and ball speed.

26. The racket system of claim 22, wherein the processor is further configured to determine relationships between particular stroke profiles and corresponding effects on muscle fatigue, injury and recovery.

27. The racket system of claim 22, wherein the cueing device provides real-time cueing to improve or avoid strokes in the stroke repertoire, or for injury prediction and diagnosis.

28. The racket system of claim 22, wherein the cueing device is further configured to generate the player feedback based on linear and angular momentum impulses measured during the stroke interactions.

* * * * *